(12) United States Patent
Jenzowsky et al.

(10) Patent No.: US 9,301,018 B2
(45) Date of Patent: Mar. 29, 2016

(54) METHOD AND SYSTEM FOR PRODUCING A USER INTERFACE FOR INTERACTIVE MEDIA APPLICATIONS

(75) Inventors: Stefan Jenzowsky, Vienna (AT); Robert Ruzitschka, Vienna (AT)

(73) Assignee: SIEMENS CONVERGENCE CREATORS GMBH, Vienna (AT)

( * ) Notice: Subject to any disclaimer, the term of this patent is extended or adjusted under 35 U.S.C. 154(b) by 15 days.

(21) Appl. No.: 13/979,704

(22) PCT Filed: Nov. 21, 2011

(86) PCT No.: PCT/EP2011/070532
§ 371 (c)(1),
(2), (4) Date: Jul. 15, 2013

(87) PCT Pub. No.: WO2012/097900
PCT Pub. Date: Jul. 26, 2012

(65) Prior Publication Data
US 2013/0305294 A1    Nov. 14, 2013

(30) Foreign Application Priority Data
Jan. 18, 2011  (DE) .......................... 10 2011 002 822

(51) Int. Cl.
*H04N 5/445* (2011.01)
*H04N 21/482* (2011.01)
*H04N 21/262* (2011.01)
*H04N 21/4722* (2011.01)

(52) U.S. Cl.
CPC ....... *H04N 21/482* (2013.01); *H04N 21/26283* (2013.01); *H04N 21/4722* (2013.01)

(58) Field of Classification Search
CPC .......... H04N 21/4722; H04N 7/17318; H04N 7/17336; H04N 21/235
USPC ........... 725/61, 93, 116, 46, 47; 709/228, 231
See application file for complete search history.

(56) References Cited

U.S. PATENT DOCUMENTS

| 6,594,699 | B1 * | 7/2003 | Sahai | H04L 29/06027 709/228 |
| 6,904,610 | B1 | 6/2005 | Bayrakeri | |
| 8,005,468 | B2 * | 8/2011 | Marolia | H04L 67/34 455/414.1 |
| 8,675,505 | B2 * | 3/2014 | Singhai | H04H 20/93 370/252 |

(Continued)

FOREIGN PATENT DOCUMENTS

EP  2141920 A1  1/2010
EP  2267609 A2  12/2010

*Primary Examiner* — Annan Shang

(57) ABSTRACT

A method and system for centrally producing user-specific user interfaces for controlling and selecting interactive media applications are provided. The system has, at each user end, an input unit used to input control signals for controlling and selecting the interactive media applications, and an output unit used to display an appropriate user-specific user interface. Following registration of the input and output units, the control signals are transmitted via a communication network to a central user interface server in the system. The user interface server initiates a user interface production unit which takes the control signals as a basis for generating user-specific elements for the user interface. A mixing component in the system adds non-user-specific elements provided by a database in the system. The user-specific user interface produced is then forwarded from a central streaming server in the system to the output unit and is displayed by the latter.

12 Claims, 1 Drawing Sheet

(56) References Cited

U.S. PATENT DOCUMENTS

| | | | | |
|---|---|---|---|---|
| 8,718,445 B1* | 5/2014 | Berger | G06Q 30/0261 | |
| | | | 386/239 | |
| 8,929,870 B2* | 1/2015 | Walker | H04L 12/18 | |
| | | | 348/14.08 | |
| 2003/0079222 A1* | 4/2003 | Boykin | H04N 7/1675 | |
| | | | 725/31 | |
| 2003/0151621 A1 | 8/2003 | Bettelheim | | |
| 2005/0283798 A1 | 12/2005 | Conroy | | |
| 2006/0259575 A1 | 11/2006 | Mann | | |
| 2008/0040758 A1* | 2/2008 | Beetcher | H04N 5/44543 | |
| | | | 725/81 | |
| 2008/0066010 A1* | 3/2008 | Brodersen | G06F 3/0486 | |
| | | | 715/810 | |
| 2008/0120668 A1* | 5/2008 | Yau | H04N 5/44582 | |
| | | | 725/110 | |
| 2010/0111434 A1* | 5/2010 | Madden | G06F 3/04817 | |
| | | | 382/255 | |

* cited by examiner

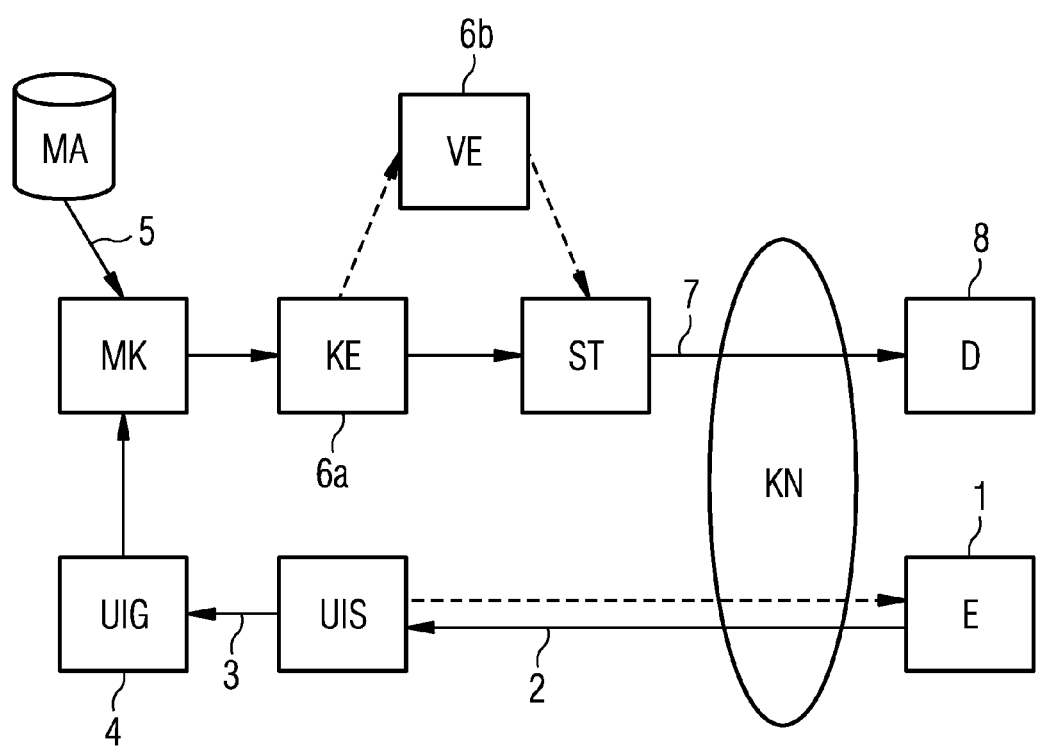

METHOD AND SYSTEM FOR PRODUCING A USER INTERFACE FOR INTERACTIVE MEDIA APPLICATIONS

CROSS REFERENCE TO RELATED APPLICATIONS

This application is the US National Stage of International Application No. PCT/EP2011/070532, filed Nov. 21, 2011 and claims the benefit thereof. The International Application claims the benefits of German application No. 10 2011 002 822.6 DE filed Jan. 18, 2011. All of the applications are incorporated by reference herein in their entirety.

TECHNICAL FIELD

The present invention relates to a method and system for centrally producing user-specific user interfaces for controlling and selecting interactive media applications, particularly for interactive television. In this case the inventive system has, at each user end, an input unit and also an output unit, particularly a television set. Control signals for controlling and selecting the interactive media applications are input by way of the input unit and a corresponding, user-specific user interface is then displayed by way of the output unit.

PRIOR ART

Television, like radio, is a mass medium. Since the 1950s television has become the key medium in the industrialized world. In 2004 95% of German households had at least one television set. From a technical point of view electromagnetic waves are generally used for television. The transmission of picture and sound by such electromagnetic waves can take place terrestrially by way of terrestrial frequencies, non-terrestrially by way of satellite frequencies with the aid of satellites or by way of coaxial cables. The terms terrestrial television, satellite television and cable television are then used depending on the selected mode of transmission.

After the general launch of television (in 1952 in Germany), color, cable and satellite transmission (1980s) the next technical step in its evolution was the digitization of the transmission of picture and sound data.

Digital television here refers both to the emission of video and audio data of the conventional television offering in digitized form and the possible offering of novel, generally interactive media applications, such as for example subtitles, Teletext, electronic program guides (EPG), multichannel sound, etc.

The most important attributes of digital television are considered to be that digital signals can be transmitted and compressed with almost no information loss. As most conventional receive devices cannot process digital signals directly, an additional digital decoder is required to receive digital television or a suitable television set, in which the decoder is already integrated.

The so-called DVB standard was developed in Europe in the 1990s for the transmission of digital television, the abbreviation DVB standing for digital video broadcasting. Standardized methods for transmitting digital content, such as video and audio data for television and radio, for multichannel sound and for the use of interactive media applications such as subtitles, Teletext, electronic program guides (EPG), etc. using digital technology are referred to as DVB.

Interactive television or I-TV refers to a television variant based on digital television, which allows a viewer to intervene in the transmitted content—the so-called program content. Possible applications for I-TV are currently electronic program guides (EPGs), video on demand, in which video data (e.g. video or television film) can be called up to order, interactive game shows, teleshopping, etc., for example. Interactive television requires digital transmission and the presence of a so-called (if necessary broadband) feedback channel. A digital decoder is generally required to receive digitally transmitted, interactive program content and this also offers the possibility of interaction. A corresponding remote controller or infrared keyboard for example can be used for navigation or interaction.

The feedback channel represents an extension of traditionally unidirectional broadcast media (e.g. radio, television), with which data—in other words program content in the form of video and/or audio data—is usually only transmitted in one direction from the transmitter to the receiver/user. Generally the feedback channel has a different structure from a forward channel, which is used for example to transmit data in a forward direction, and is used for example for control purposes (e.g. to start a defined program content, etc.).

One particular form of interactive digital television is what is known as IP-TV or internet protocol television. IP-TV refers to a digital transmission of program content (e.g. films, etc.) and/or media applications by way of a digital communication network. The protocol underlying the internet—the internet protocol IP—is used for this and generally a broadband connection because of the high data rate required for the transmission. Typical applications offered by way of IP-TV are for example video on demand, internet TV, which plays so-called video streams from the internet, live TV, etc. Because the internet protocol is used, IP-TV is immediately feedback channel-compatible, while with other technologies (e.g. cable television, satellite television, etc.) for example the feedback channel must first be configured for interaction. IP-TV also offers the possibility of not only using IP-compatible TV sets such as for example corresponding television sets and or combinations of television set and corresponding decoder to utilize the media content and applications but also personal computers, IP-compatible mobile phones (e.g. UMTS mobile phones), tablet PCs, laptops and/or games consoles.

To use and select I-TV media content or media applications the terminal (e.g. television set, digital decoder, etc.) generally provides the user with graphical user interfaces (GUI), which are generally displayed on the screen of the terminal. A graphical user interface or GUI is a component which allows a user of media applications to interact with said applications, by way of graphical symbols and elements for example. The graphical symbols can generally be selected and controlled here using an input unit, such as a pointer, remote controller, touch screen, etc. The user interface therefore has the task of allowing media content and media applications offered for example by interactive television to be selected and used by means of the graphical symbols and elements. Depending on the application selected, the user interface can then be adapted to the selection; for example a submenu can be displayed when a menu point is selected; content can be listed when media content is selected in the EPG; etc.

However the terminals use for the consumption of media content and media applications, such as television sets, decoders, PCs, mobile phones, etc., generally do not offer a standard platform for the implementation or display of user interfaces and/or to develop interactive applications that can be selected and controlled therein. This means that a dedicated corresponding application for displaying a—particularly user-specific—user interface quite often has to be developed and implemented for each terminal. This has the disadvantage of entailing major outlay and expense. Also user-specific user interfaces, the display and operation of which are largely terminal-independent, are very difficult or even barely possible to configure.

Also the different platforms used in the terminals—TV sets and decoders in particular have very different platforms depending on the manufacturer—mean that the graphical display and the functionality of the user interfaces are generally limited by the respective technical possibilities of the devices or the platforms used. In particular older devices (e.g. television sets, decoders, etc.) cannot display modern user interfaces due to a lack of performance or can only display them in a limited manner. Attractive, new user interfaces with innovative, new functionalities, which are also tailored to the needs of the respective user, can therefore often only be provided with major outlay or after replacing the respective terminal.

PRESENTATION OF THE INVENTION

The object of the invention is therefore to specify a method and system, by means of which user-specific user interfaces can be produced, modified and displayed without major outlay and in an economical manner independently of the terminal or output device.

This object is achieved by a method and system of the type mentioned in the introduction having the features according to the independent claims. Advantageous embodiments of the present invention are described in the dependent claims.

According to the invention the object is achieved with a method of the type mentioned in the introduction, in which following the process of registration of an input unit—for example a web-compatible device (e.g. mobile phone, PC, laptop, tablet PC, etc.) and an output unit (e.g. TV set and decoder, TV set with integrated decoder, etc.) with a central service, control signals are transmitted by way of a communication network to a central user interface server. The user interface server then initiates a central user interface production unit, which takes the input and/or received control signals (e.g. user input, user profile, etc.) as a basis for generating user-specific elements for the user-specific user interface. These user-specific elements for the user interface are forwarded for example as a data stream or picture data to a central mixing component, which adds non-user-specific elements for the user interface. The user-specific user interface thus produced is then forwarded as a data stream from a central streaming server by way of the communication network to the output unit. The output unit then converts the data stream (e.g. video and/or audio data) to the corresponding display of the user-specific user interface and displays it to the user.

The main aspect of the inventively proposed solution is that the user interface is not interpreted at the user end and generated and displayed by a, for example, terminal-specific logic. Rather the user-specific user interface is delivered as a compressed data stream (e.g. video data stream, etc.) by way of a communication network—in the same way as the delivery of displayed media content (e.g. films, videos, etc.). This considerably reduces the dependency on the respective attributes or the respective platform of the terminal or the output unit. As with many modern TV sets and/or decoders a functionality for interpreting and displaying data streams is already present and can be used, the user interface can be produced and modified in a user-specific manner without major outlay and largely independently of the platform.

The inventive method also reduces outlay for the implementation of new, graphical user interfaces for many different terminal or output unit platforms. Also graphical effects and/or user-specific elements for the user interface can be designed and implemented independently of the performance of the output unit—in particular the TV set.

In one expedient development of the inventive method provision is made for a user-specific initial user interface with selection options to be generated and displayed on the output unit following registration of the input and output units with the central service. When control signals are input by means of the input unit to the user interface server, this initial user interface is then adapted in a user-specific manner by the user interface production unit based on the control signals. The adapted user interface is then completed by the mixing component and forwarded by the central streaming server as a data stream to the output unit to be displayed and output to the user.

This allows the input and output units to be registered with the central service in an automated form in a simple manner. The output unit for example registers with the central streaming server and a user-specific or personalized media content (e.g. TV content, video and/or music files, etc.) is requested by the output unit. The input unit registers in a parallel manner, for example by way of an identification procedure, with the central user interface server. A correlation of the individual data stream—in other words the personalized media content—and the connection is then brought about by way of the communication network for control purposes based on the respective registrations. On this basis the user is then presented on the output unit with the initial user interface with different selection options, in particular in relation to the personalized media content. Selection by means of the input unit then brings about control signals, which result in the generation and display of a modified user interface by means of the inventive method. The modified user interface is then presented to the user on his/her output unit, without a direct interaction—in other words exchange/transmission of control signals, input data, etc.—having taken place between output unit and communication network.

It is advantageous if the user interface server manages current status information for each user and/or each control signal input. Inputting control signals then brings about a change in the status information at the user interface server, prompting the user interface production unit in a simple manner to modify the user-specific elements for the user interface. The user interface server therefore knows the current status of a user (e.g. registered, current selection, etc.) and the current interactions of said user at all times.

It is also favorable if the user-specific user interface that has been produced and can be transmitted as a data stream is converted to a format that is suitable for transmission by way of the communication network by a central encoding unit before being forwarded by the central streaming server. This allows the transmission of the data stream to be adapted ideally to the respective requirements or formats of the transmitting communication network (e.g. internet, DVB, etc.) thereby reducing interference due to such transmission.

In one preferred embodiment of the inventive method the user-specific user interface that has been produced and can be transmitted as a data stream is encrypted by an encryption unit before being forwarded by the central streaming server. This allows the data stream, which contains the user-specific user interface, to be transmitted securely to the respective output unit. The data stream and therefore correspondingly the user-specific user interface can then only be decrypted by the output unit of the respective user, for example by means of a decryption component.

It is further advantageous if the internet is used as the communication network for the transmission of the input control signals to the central user interface server and for forwarding the user-specific user interface transmitted as a data stream to the output unit. As a communication network the internet has the advantage that it is immediately feedback channel-compatible as the internet protocol (IP) is used. This means that control signals, for example for selecting displayed media content, modifying the user interface, etc., can be input in a simple manner by way of any IP-compatible and/or web-compatible input device, e.g. a web-compatible mobile phone, PC, etc.

Alternatively of course it is possible to use a feedback channel already configured in the respective output device or terminal (e.g. TV set, decoder, etc.) for other technologies (e.g. cable television, satellite television, etc.) for inputting simple control signals to the user interface server. A remote controller belonging to the terminal for example can then be used as the input unit.

The object is also achieved by a system of the type mentioned in the introduction, which is set up to carry out the inventive method, with an output unit for displaying user-specific user interfaces and an input unit for inputting control commands being provided at each user end. The inventive system also comprises a central user interface server for receiving and processing the control signals input by way of the communication network and for managing current status information relating to respective users and/or respective control signal inputs and a central user interface production unit for generating and/or modifying the respectively user-specific elements of the user interface based on the control signals. The inventive system also has a database for providing non-user-specific elements for the respective user interfaces, a mixing component for connecting user-specific and non-user-specific elements of the user interfaces and a central streaming server for forwarding the user-specific user interfaces produced as a data stream by way of the communication network to the output unit.

The main aspect of the inventive system is that components and logic for producing and modifying the user interface are not predetermined at the user end—in other words by functionality and technical possibilities of the terminal at the user end or its platform—but by central components and logic. These components can evaluate and process input control signals as a function of user-specific status information, generate user-specific user interface elements based on the received control signals, mix these with user-independent elements to produce a user interface and forward the finally produced user interface as a data stream to the output unit for display.

This limits the functionality of the output unit at the user end to displaying a data stream (e.g. video/audio data, etc.), thereby reducing dependency on the functionality and attributes of the output unit or its platform. The inventive system also allows graphical user interfaces with new elements to be implemented, modified and displayed in a user-specific manner simply and without major outlay. Graphical effects of the user interface are likewise independent of the performance of the output unit, which only has to be set up to be able to interpret and display a data stream of for example video and/or audio data.

It is also advantageous if an encoding unit is provided, which can convert the user-specific user interfaces transmitted as a data stream to a format that is suitable for forwarding by way of the communication network. This adapts the transmission of the data stream ideally to the requirements (e.g. data formats, transmission output, etc.) of the transmitting communication network and avoids errors when transmitting the user-specific user interface.

It is further favorable if the inventive system also comprises an encryption unit for encrypting the user-specific user interfaces transmitted as a data stream. Encryption means that the data stream for the user interface is transmitted securely to the respective user and can be protected against access by unauthorized parties. Decryption of the data stream or user interface can then be performed by the output unit of the respective authorized user.

The internet is ideally provided as the communication network for the input control signals and transmission of the user-specific user interfaces transmitted as a data stream. This has the advantage that a feedback channel does not additionally have to be configured—as with other TV technologies (e.g. cable television, satellite television, etc.) for inputting control signals—for example in the output unit or by way of a separate input unit. Use of the internet protocol (IP) means that the internet is immediately feedback channel-compatible.

An IP-compatible output device, such as an IP-compatible television set, a PC display unit, etc., can then advantageously be used as the output unit. This output device should be set up to display an IP-based data stream and—where the encryption component is used—to decrypt the data stream. Where the internet is used as the communication network it is also advantageous, if an internet protocol-compatible input device, in particular an internet protocol-compatible mobile phone and/or a personal computer, is provided as the input unit. This allows the control signals to be input in a simple manner.

Alternatively it is also possible when using other technologies (e.g. cable television, satellite television, etc.) to use the already configured feedback channel for inputting simple control commands to the user interface server. A remote controller belonging to the output unit can then be used for inputting. The output unit—in other words TV set, decoder, etc.—should however always have the functionality of being able to display compressed data streams of for example video and/or audio data supplied from the communication network.

BRIEF DESCRIPTION OF THE DRAWING

The invention is described below in an exemplary manner with reference to the accompanying FIGURE.

FIG. 1 shows an exemplary and schematic diagram of the inventive system and the sequence of the inventive method for centrally producing a user-specific user interface for controlling and selecting interactive media applications.

EMBODIMENT OF THE INVENTION

FIG. 1 shows an exemplary and schematic diagram of the inventive system for centrally producing a user-specific user interface, which comprises a number of components. The inventive system here has an output unit D at the user end, which is set up to display a data stream of video and/or audio data for example, which is received by way of a communication network KN. Many TV sets and decoders for example have this functionality as do other terminals such as PCs, tablet PCs, mobile radio devices and/or games consoles. The internet for example can be used as the communication network KN for transmitting the data stream.

The inventive system also has an input unit E at the user end, with the aid of which control signals can be input and forwarded by way of the communication network KN. The internet for example can again be used as the communication network KN. Where the internet is used, an internet-compatible device such as a mobile phone, PC, etc. can be used as the input unit E. Alternatively a remote controller for example can be used as the input unit E, if a feedback channel—for example for inputting simple control signals as with satellite and/or cable television for example—is configured in the output unit D.

For centrally producing a user-specific user interface the system further comprises a central user interface server UIS. Control signals input by a user by way of the input unit E are received by the user interface server UIS. The user interface server UIS is also able to manage current status information for every user of a central service for producing and modifying user-specific user interfaces as well as for every corresponding user interaction. The status information for a user or for the respective user information can be changed by the user interface server UIS according to a user interaction (i.e. input by way of the input unit E). The user interface server UIS is also able to transmit context-sensitive information to the input unit by way of the communication network KN to display the user-specific user interface.

To generate and/or modify user-specific elements of the user interface to be produced, the system comprises a central user interface production unit UIG. The user interface production unit UIG is initiated by the user interface server UIS based on the input control signals, which can bring about for example a change in the managed status information at the user interface server UIS. The information in the control signals is hereby forwarded from the user interface server UIS to the user interface production unit UIG and on this basis the user interface production unit UIG generates those elements of the user interface that are user-specific. In other words the user interface production unit UIG produces the elements defined by the interaction of the user and by a selected media application for the user interface for example in the form of a data stream and/or a picture. This means that the user interface thus produced is individually different for every user.

The inventive system also comprises a mixing component MK. The mixing component MK adds non-user-specific elements for the user interface to the user-specific elements supplied by the user interface production unit UIG. In other words said component links individual user-specific components of the user interface to content or components which are supplied in the same form for all users. These elements/components are provided by a database MA, for example in the form of a data stream for the mixing component MK.

The inventive system also has a so-called central streaming server ST, which supplies the produced user interface to the output unit D in the form of a data stream by way of the communication network KN in particular at the request of the output unit D. The streaming server ST receives the data stream for the user interface from the mixing component or from an encoding unit KE and/or from an encryption unit VE—in so far as one of these two optional units or these two optional units is/are used in the inventive system.

The optional encoding unit KE converts the data stream supplied by the mixing component MK, if necessary, to a format that is suitable for streaming—in other words for the transmission of the data stream by way of the communication network KN. With the aid of the encryption unit VE the data stream for the individual user interface can be encrypted—if necessary—by the streaming server ST before transmission by way of the communication network KN. If the system has an encoding unit KE and/or encryption unit VE, the output unit must be set up for decoding or optionally for decryption.

At the start of the inventive method, which is carried out by means of the inventive system illustrated in a schematic and exemplary manner in FIG. 1, the output unit D and input unit E are registered with a central service, thereby initiating the production and/or modification of an individual, user-specific user interface. The input unit E can use for example an identification procedure (e.g. login procedure, etc.) to register with the user interface server UIS. This procedure can run for example automatically or user inputs (e.g. a so-called login, etc.) for example may be required for registration. Registration of the output unit D at the streaming server can be performed for example by requesting a personalized initial user interface. Registering output unit D and input unit E in this manner allows correlation of the individual data stream defining the user interface and the connection for controlling or inputting control signals by way of the communication network KN.

An initial user interface with selection options is now displayed to the user on the output unit D. In a first method step 1 control signals are input by the user for selection by way of the input unit or there is an interaction with the input unit. In a second method step 2 the control signals are then sent for example in encoded form from the input unit E by way of the communication network KN to the user interface server UIS. The status information for this user and/or this user interaction is therefore changed on the user interface server UIS. In other words the user interface server UIS switches to a new status for the specific user.

The changed status information means that in a third method step 3 the user interface production unit UIG is prompted by the user interface server UIS to generate new, user-specific elements for the already displayed (initial) user interface in a fourth method step 4. The new, user-specific elements for the modification or production of the user-specific user interface are then forwarded from the user interface production unit UIG either as a data stream or in the form of a picture file to the mixing component MK.

In a fifth method step 5 the mixing component MK adds in some instances already available content for the specific user or content or elements that are available in the same form for all users. This content or non-user-specific elements is/are supplied here from the database MA, for example as a data stream containing said content and/or elements.

If the system has the optional encoding unit KE, the data stream displaying the user interface is transmitted from the mixing component MK to the encoding unit KE and converted by this latter to a format suitable for the transmission in an optional sixth method step 6a. If the optional encryption unit VE is also provided, after encoding in the optional sixth method step 6a the data stream is sent to the encryption unit VE in an optional seventh method step 6b and encrypted by it. The data stream containing the user interface is then forwarded to the streaming server ST.

If the system does not have an encoding unit KE or an encryption unit VE, the respective method step 6a and/or 6b can be omitted. The user interface is then transmitted directly in the form of the data stream from the mixing component or from the respectively present optional unit KE or VE to the streaming server ST. From the streaming server the user interface is delivered as a data stream in an eighth method step 7 by way of the communication network KN to the output unit D. Where the internet is used as the communication network KN the data stream is transmitted for example in the form of so-called IP packets.

In a ninth method step 8—if necessary after decoding or decryption of the received data stream—a new/modified user interface is then displayed to the user by the output unit D. A new interaction of the user by way of the input unit E brings about a new run through the method steps 1 to 8 and the displayed user interface is restructured or changed according to the input control signals. This brings about dynamic modification of the data stream (audio and/or video data) for the displayed user interface, with the attributes (e.g. platform, functionality, etc.) of the output unit D advantageously having a relatively minor influence.

The invention claimed is:

1. A method for centrally producing a user-specific user interface for controlling and selecting interactive media applications, particularly for interactive television, wherein the user interface is displayed at the user end on an output unit and wherein control signals for controlling and selecting the media applications are input at the user end by way of an input unit, comprising:
following the process of registration of the input unit and the output unit with a central service, the control signals are transmitted by way of a communication network to a central user interface server,
the user interface server initiates a user interface production unit, which takes the control signals as a basis for generating user-specific elements for the user interface,
a mixing component connected to a database adds non-user-specific elements from the database to the generated user-specific elements,
and the user-specific user interface produced is then forwarded as a data stream from a central streaming server by way of the communication network to the output unit and displayed by this latter.

2. The method as claimed in claim 1, wherein a user-specific initial user interface with selection options is generated and displayed on the output unit following registration of the input unit and output unit with the central service, when control signals are input by means of the input unit to the user interface server, this initial user interface is then adapted in a user-specific manner by the user interface production unit based on the control signals and the adapted user interface is then completed by the mixing component, forwarded by the central streaming server as a data stream to the output unit and displayed by this latter.

3. The method as claimed in claim 1, wherein the user interface server manages current status information for each user and/or each control signal input and the inputting of control signals brings about a change in the status information at the user interface server, prompting the user interface production unit to modify the user-specific elements for the user interface.

4. The method as claimed in claim 1, wherein the user-specific user interface that has been produced and can be transmitted as a data stream is converted to a format that is suitable for transmission by way of the communication network by a central encoding unit before being forwarded by the central streaming server.

5. The method as claimed in claim 1, wherein the user-specific user interface that has been produced and can be transmitted as a data stream is encrypted by an encryption unit before being forwarded by the central streaming server.

6. The method as claimed in claim 1, the internet is used as the communication network for the transmission of the input control signals to the central user interface server and for forwarding the user-specific user interface transmitted as a data stream to the output unit.

7. A system for carrying out the method as claimed in claim 1,
wherein said system comprises, at each user end, an output unit for displaying user-specific user interfaces and an input unit for inputting control commands, the following are provided:
a central user interface server for receiving and processing the control signals input by way of the communication network and for managing current status information relating to respective users and/or respective control signal inputs
a central user interface production unit for generating and/or modifying the respectively user-specific elements of the user interfaces based on the control signals,
a database for providing non-user-specific elements for the respective user interfaces,
a mixing component for connecting user-specific and non-user-specific elements of the user interfaces,
and a central streaming server for forwarding the user-specific user interfaces produced as a data stream by way of the communication network to the output unit.

8. The system as claimed in claim 7, wherein an encoding unit is also provided, which converts the user-specific user interfaces transmitted as a data stream to a format that is suitable for forwarding by way of the communication network.

9. The system as claimed in claim 7, wherein an encryption unit is provided for encrypting the user-specific user interfaces transmitted as a data stream.

10. The system as claimed in claim 7, wherein the internet is provided as the communication network for the input control signals and transmission of the user-specific user interfaces transmitted as a data stream.

11. The system as claimed in claim 7, wherein a display device, in particular an internet protocol-compatible television set, is provided as the output unit, being set up to display and optionally to decrypt an internet protocol-based data stream.

12. The system as claimed in claim 7, wherein an internet protocol-compatible input device, in particular an internet protocol-compatible mobile phone and/or a personal computer, is provided as the input unit.

* * * * *